(12) United States Patent
Xiao

(10) Patent No.: US 7,981,243 B2
(45) Date of Patent: Jul. 19, 2011

(54) METHOD OF MANUFACTURING LAMINATED DAMPING STRUCTURE WITH VULCANIZED RUBBER AS VISCOELASTIC CORE

(75) Inventor: Hong Xiao, Farmington Hills, MI (US)

(73) Assignee: Material Science Corporation, Elk Grove Village, IL (US)

( * ) Notice: Subject to any disclaimer, the term of this patent is extended or adjusted under 35 U.S.C. 154(b) by 758 days.

(21) Appl. No.: 12/061,679

(22) Filed: Apr. 3, 2008

(65) Prior Publication Data
US 2009/0249627 A1 Oct. 8, 2009

(51) Int. Cl.
*B32B 37/00* (2006.01)
(52) U.S. Cl. ............. 156/307.5; 156/307.3; 156/184; 156/307.7
(58) Field of Classification Search ........... 156/307.3, 156/307.1, 307.5, 307.7, 184
See application file for complete search history.

(56) References Cited

U.S. PATENT DOCUMENTS

| | | | | |
|---|---|---|---|---|
| 2,274,260 A | * | 2/1942 | Schelhammer et al. | ...... 264/175 |
| 2,743,479 A | * | 5/1956 | Rhee et al. | ......... 425/174.8 R |
| 4,889,578 A | | 12/1989 | Kei et al. | |
| 5,213,879 A | | 5/1993 | Niwa et al. | |
| 5,368,916 A | | 11/1994 | Fujimoto et al. | |
| 5,698,633 A | | 12/1997 | Matsumoto et al. | |
| 5,853,070 A | | 12/1998 | Josefsson | |
| 6,465,110 B1 | | 10/2002 | Boss et al. | |
| 6,599,640 B2 | | 7/2003 | Suzuki et al. | |
| 2005/0019590 A1 | | 1/2005 | Josefsson | |

FOREIGN PATENT DOCUMENTS
EP 0478196 A1 4/1992
* cited by examiner

*Primary Examiner* — Jeff H Aftergut
(74) *Attorney, Agent, or Firm* — Quinn Law Group, PLLC

(57) ABSTRACT

The present invention provides an improved method of manufacturing constrained layer dampers with a vulcanized rubber viscoelastic core. The method includes the steps of: applying a first layer of adhesive to a first constraining layer; applying a layer of unvulcanized rubber solved in a solvent to the first layer of adhesive to form a first laminate structure; applying a second layer of adhesive to a second constraining layer to form a second laminate structure; laminating the first laminate structure with the second laminate structure; coiling the laminated first and second laminate structures; and increasing the temperature of the coiled first and second laminate structures to thereby vulcanize the layer of rubber.

20 Claims, 2 Drawing Sheets

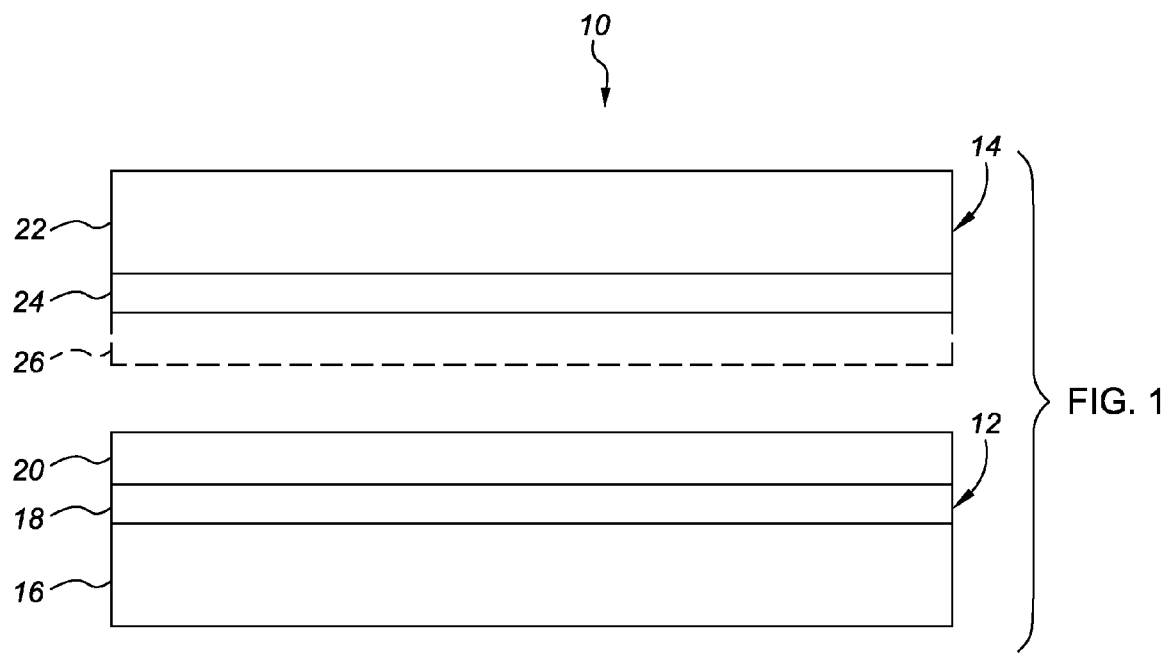
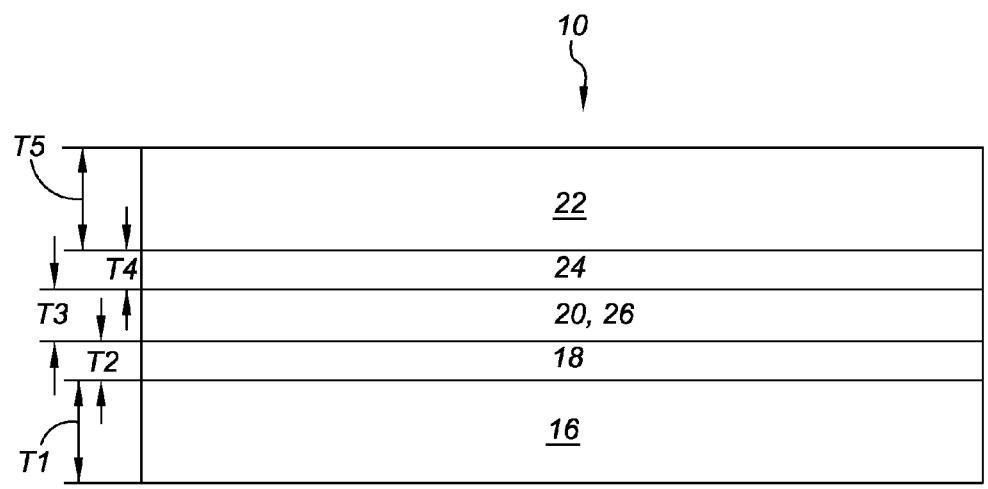

METHOD OF MANUFACTURING LAMINATED DAMPING STRUCTURE WITH VULCANIZED RUBBER AS VISCOELASTIC CORE

TECHNICAL FIELD

The present invention relates generally to laminated structures for sound and vibration mitigation, and more specifically to methods of manufacturing constrained layer damping structures with a viscoelastic core adhered between metallic constraining layers.

BACKGROUND OF THE INVENTION

Attaching a layer of viscoelastic material to component parts of a mechanical or electromechanical system may reduce unwanted noise and vibration, helping to diminish the propagation of structure-borne noise and the transmission of airborne noise. A two-layered or unconstrained type damping structure is made by providing a viscoelastic layer of rubber or synthetic resin on a metal plate. A three-layered or constrained type damping structure comprises a viscoelastic core sandwiched between a pair of metallic constraining layers. The ability of the damping structure to damp vibrations is known as its "loss factor", with a higher loss factor indicating greater damping capability.

For constrained layer dampers (CLD), a force applied to the constraining layers drives the viscoelastic material into shear along the constraining layers, thereby converting a substantial amount of vibrational energy into heat. Increasing the shear within the damping structure, therefore, also increases the energy dissipating characteristics therein. It is thus desirable to provide a damping structure with increased shear to increase the loss factor. A method of making such a constrained layer viscoelastic laminate structure is disclosed in commonly assigned U.S. Pat. No. 6,202,462, to Hansen et al., issued Mar. 20, 2001, which is hereby incorporated by reference in its entirety.

Constrained layer dampers are sometimes used, for example, in the automotive industry for vehicle body panels as well as damping inserts for automobile brake systems. Traditionally, the viscoelastic core of the damping insert for automobile brake systems is made of a thermoplastic or a thermosetting material. Damping inserts with a thermoplastic-type viscoelastic core, such as thermoplastic pressure sensitive adhesives (PSA) and hot-melt-adhesive films, may encounter delaminating problems during harsh conditions, and from the high temperature and high pressure generated by many automotive brake systems. Comparatively, thermosetting-type adhesives, such as epoxy and phenolic resin, provide higher bonding strength, but may not offer sufficient damping capacity due to the high cross-linking density of the thermosetting materials.

The use of vulcanized rubber as the viscoelastic core for a CLD provides higher bonding strength than traditional thermoplastic-type viscoelastic core, and good sound and vibration damping characteristics. The higher bonding strength is needed for harsh application conditions (e.g., during stamping processes) and higher temperature applications (e.g., for brake shims, etc.).

A method of making a CLD with a vulcanized rubber viscoelastic core is disclosed in U.S. Pat. No. 5,213,879, to Niwa et al. (hereinafter "Niwa"), issued May 25, 1993, which is hereby incorporated by reference in its entirety. The Niwa patent relates to automotive brake inserts constructed by laminating a vulcanized rubber sheet onto a metallic constraint plate. Specifically, Niwa proposes to use a rigid polyamide adhesive film to bond a vulcanized rubber sheet onto iron plates. Unlike the present invention, Niwa's method vulcanizes the NBR rubber into a sheet, then piles the rubber sheet onto an iron plate with an epoxy primer treatment, places a second iron plate with an epoxy primer treatment on top of the pre-vulcanized rubber sheet, and subsequently laminates the structure in a single, discontinuous step using a hot press.

A method of making a CLD with a vulcanized rubber viscoelastic core is also disclosed in U.S. Pat. No. 5,853,070, to Josefsson (hereinafter "Josefsson"), issued Dec. 29, 1998, which is hereby incorporated by reference in its entirety. Josefsson discloses a method of making steel-rubber-steel laminate brake inserts. In the method of Josefsson, an uncured rubber film is applied between two layers of steel, and vulcanized in a lengthy, continuous process. It is the vulcanized rubber that acts as the bonding layer for Josefsson's brake insert, as well as the vibration damping viscoelastic core for the CLD.

However, vulcanizing rubber in a continuous process requires a large number of expensive ovens to maintain adequate throughput. Moreover, the use of thin calendered rubber sheets as taught by Josefsson requires expensive calendering equipment. In addition, applying the rubber sheet during the coil process requires use of an expensive carrier sheet. Also, in order to prevent separation of the steel constraining layers at high vulcanization temperatures, a special vulcanizing machine and expensive escort webs are needed to complete the process. Finally, the thickness of calendered rubber sheets is difficult to control, especially at low thicknesses—e.g., on the order of 0.10-0.15 millimeters or 4-6 mils.

SUMMARY OF THE INVENTION

The present invention provides an improved, more efficient, and more cost effective method of manufacturing laminated damping structures with a vulcanized rubber viscoelastic core. The laminated damping structures produced by the present invention offer higher bonding strengths than a traditional CLD with thermoplastic-type viscoelastic core, and enhanced sound and vibration damping characteristics. Consequently, the laminate structures produced by the present invention may be utilized in high temperature and pressure applications, can be employed in harsh working environments, and are suitable for continuous coil coating/lamination processes.

According to one embodiment of the present invention, a method of manufacturing a laminate damping structure with rubber as a viscoelastic core is provided. The method includes: applying a first layer of adhesive to a first constraining layer; applying a first layer of unvulcanized rubber solved in a solvent to the first layer of adhesive to form a first laminate structure; applying a second layer of adhesive to a second constraining layer to form a second laminate structure; laminating the first laminate structure to the second laminate structure; coiling the laminated first and second laminate structures; and heating the coiled first and second laminate structures to thereby vulcanize the first layer of rubber.

According to one aspect of this embodiment, laminating the first laminate structure to the second laminate structure preferably includes heating the second layer of adhesive, and thereafter compressing the first laminate structure together with the second laminate structure. To this regard, laminating the first laminate structure to the second laminate structure preferably also includes heating the first layer of rubber prior to compressing the first and second laminate structures. Compressing the first and second laminate structures may include passing the two laminate structures through a nip press in a substantially continuous manner.

According to another aspect of this embodiment, heating the coiled first and second laminate structures includes heating the coiled laminate structures at a temperature of approximately 285 degrees Celsius (° C.) for approximately eight hours.

In accordance with another aspect of this embodiment, the first and second constraining layers consist essentially of a metallic material, preferably steel. In a similar regard, the first and second layers of adhesive preferably consist essentially of phenolic adhesives. Ideally, the first layer of unvulcanized rubber consists essentially of nitrile rubber.

In accordance with yet another aspect, each of the constraining layers has a thickness of approximately 0.254-1.016 millimeters (10-40 mils). Preferably, each of the layers of adhesive has a thickness of approximately 0.008-0.018 millimeters (0.3-0.7 mils). Moreover, the layer of unvulcanized rubber has a thickness of approximately 0.025-0.203 millimeters (1-8 mils).

According to yet another aspect of this embodiment, the method also includes applying a second layer of unvulcanized rubber solved in a solvent to the second layer of adhesive prior to laminating the first laminate structure to the second laminate structure.

In accordance with another embodiment of the present invention, a method of manufacturing a noise-damping constrained layer laminate structure with a rubber viscoelastic core is provided. The method includes the steps of: applying a first layer of thermoset adhesive to a first metallic constraining layer in a substantially continuous and uniform manner; drying the first layer of thermoset adhesive; applying a layer of unvulcanized rubber solved in a solvent to the first layer of thermoset adhesive in a substantially continuous and uniform manner to form a first laminate structure; drying the layer of unvulcanized rubber; applying a second layer of thermoset adhesive to a second metallic constraining layer in a substantially continuous and uniform manner to form a second laminate structure; drying the second layer of thermoset adhesive; heating the second layer of thermoset adhesive; compressing the first laminate structure with the second laminate structure in a substantially continuous manner; coiling the compressed laminate structures; and heating the coiled laminate structures to thereby vulcanize the layer of rubber and the layers of thermoset adhesive.

In accordance with one aspect of this embodiment, each of the metallic constraining layers has a thickness of approximately 0.178-0.508 millimeters (7-20 mils). Preferably, each of the layers of thermoset adhesive has a thickness of approximately 0.008-0.018 millimeters (0.3-0.7 mils). Moreover, the layer of unvulcanized rubber has a thickness of approximately 0.025-0.178 millimeters (1-7 mils).

The above features and advantages, and other features and advantages of the present invention will be readily apparent from the following detailed description of the preferred embodiment and best modes for carrying out the present invention when taken in connection with the accompanying drawings and appended claims.

BRIEF DESCRIPTION OF THE DRAWINGS

FIG. 1 is a schematic side-view illustration of first and second laminate structures fabricated in accordance with the methods of the present invention;

FIG. 2 is a schematic side-view illustration of a constrained layer damping structure with a vulcanized rubber viscoelastic core formed from the first and second laminate structures of FIG. 1 in accordance with the methods of the present invention;

DETAILED DESCRIPTION OF THE PREFERRED EMBODIMENT

Figure 3:
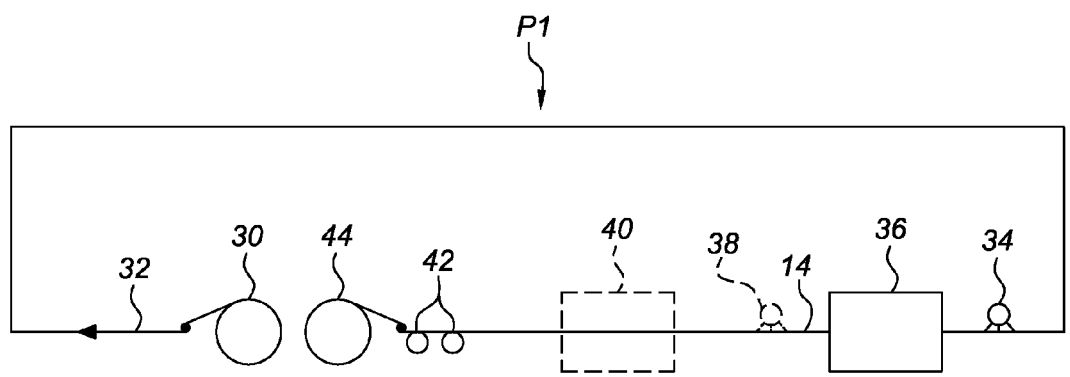
FIG. 3 is a schematic illustration of one portion of an exemplary coil coating and lamination assembly for practicing the methods of the present invention.

Referring to the drawings, wherein like reference numbers refer to like components throughout the several views, FIGS. 1 and 2 schematically illustrate a constrained layer damping structure with a vulcanized rubber viscoelastic core, identified generally at 10 and referred to hereinafter as "damping structure", that is fabricated in accordance with the methods of the present invention. The embodiments of the present invention will be described herein with respect to the structure illustrated in FIGS. 1-2 and the arrangement presented in FIGS. 3-4. It should be readily understood that the present invention is by no means limited to the exemplary applications presented in FIGS. 1-4. In addition, the drawings presented herein are not to scale and are provided purely for explanatory purposes. Thus, the specific and relative dimensions shown in the drawings are not to be considered limiting.

The damping structure 10 of FIGS. 1 and 2 consists of two primary constituent portions: a first and a second laminate structure, indicated generally at 12 and 14, respectively, in FIG. 1. The first laminate structure 12 includes a first constraining layer 16 having a first engineered viscoelastic layer 20 spanning substantially the entirety of the first constraining layer 16, and adhered to a first surface thereof by a first layer of adhesive 18, which also spans substantially the entirety of the first constraining layer 16. The second laminate structure 14 includes a second constraining layer 22 having a second layer of adhesive 24 spanning substantially the entirety of the second constraining layer 22. In an optional embodiment, the second laminate structure 14 may include a second engineered viscoelastic layer, shown hidden in FIG. 1 at 26, which spans substantially the entirety of the second constraining layer 22, and adhered to a first surface thereof by the second layer of adhesive 24. To this regard, the first and second laminate structures 12, 14 may individually or collectively include additional constraining layers, additional adhesive layers, additional viscoelastic layers, and various other additional layers (e.g., an electro-galvanized coating, dichromate paint, zinc plating, etc.) without departing from the intended scope of the present invention. As will be described in extensive detail hereinbelow, the two laminate structures 12, 14 of FIG. 1 are laminated together, coiled, and subsequently cured to form the damping structure 10 shown in FIG. 2.

The first and second constraining layers 16, 22 may be formed from any material with the necessary stiffness and structural durability for the intended application of the laminated damping structure 10. By way of example, the first and second constraining layers 16, 22 are preferably fabricated from either a metallic or a polymeric material, which may include, but is not limited to, high strength plastics, aluminum, magnesium, titanium, and steel. In accordance with preferred practices, the material for the first and second constraining layers 16, 22 is steel. In a similar regard, the first and second layers of adhesive 18, 24 consist of those adhesives, whether natural or synthetic, which provide sufficient bonding strength for the viscoelastic layer 20 (and 26, where present), and sufficient resiliency to withstand the manufacturing environment for fabricating the laminated damping structure 10. Ideally, the first and second layers of adhesive 18, 24 are each thermoset adhesives, preferably in the nature of phenolic-type adhesives. Finally, as will be explained in extensive detail hereinbelow, the viscoelastic layer 20 (and 26, when present) is fabricated from either a natural or synthetic rubber, preferably in the nature of nitrile rubber, which is vulcanized in a single, post-lamination batch process. Notably, the thickness and composition of the viscoelastic layer 20 may be modified to tailor to the composite loss factor, bond strength, overall stiffness, and additional characteristics dictated by the specific application of the laminated damping structure 10.

The first and second constraining layers 16, 22 may be the same thickness and material, however, they need not be. This is also true for the first and second adhesive layers 18, 24 and, when applicable, the first and second viscoelastic layers 20, 26. By way of example, each of the constraining layers 16, 22 has a thickness (T1 and T5 of FIG. 2, respectively) of approximately 0.254-1.016 millimeters (10-40 mils), but preferably 0.178-0.508 millimeters (7-20 mils). Similarly, each layer of adhesive 18, 24 has a thickness (T2 and T4 of FIG. 2, respectively) of approximately 0.00762-0.01778 millimeters (0.3-0.7 mils), but preferably 0.008-0.018 millimeters (0.3-0.7 mils). As a further example, the layer of unvulcanized rubber 20, 26 has a cumulative thickness (T3 of FIG. 2) of approximately 0.0254-0.2032 millimeters (1-8 mils), but preferably 0.025-0.178 millimeters (1-7 mils).

Figure 4:
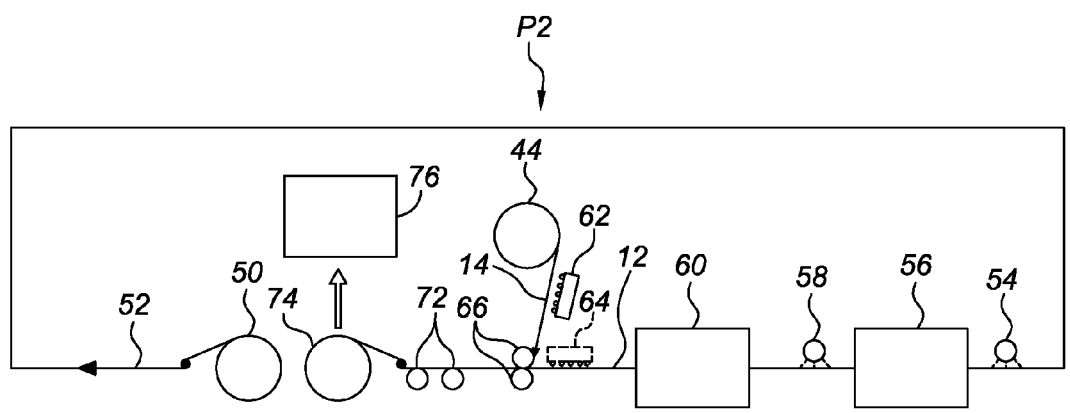
FIG. 4 is a schematic illustration of another portion of the exemplary coil coating and lamination assembly for practicing the methods of the present invention.

An exemplary coil coating and lamination assembly for practicing the methods of the present invention is schematically shown in FIGS. 3 and 4 of the drawings, divided into two primary segments—pass one P1 in FIG. 3 and pass two P2 in FIG. 4. The present invention is described herein with respect to the arrangement illustrated in FIGS. 3 and 4 as an exemplary application by which the methods of the present invention may be practiced. The present invention, however, may also be employed in other coating and lamination assemblies. Furthermore, the methods of the present invention preferably include at least those steps identified below. Nevertheless, it is within the scope and spirit of the claimed invention to omit steps, include additional steps, and/or modify the order presented herein.

A first strip of sheet metal 32 (which may also be referred to as "metallic constraining layer") is pulled or uncoiled from a first coil of metal sheet stock 30, such as draw quality cold rolled steel, and fed or passed through a first coating device (or top coater) 34. The first coating device 34 is operable to apply a layer of thermoset adhesive (e.g., second adhesive layer 24 of FIGS. 1 and 2) to the metallic constraining layer 32 in a substantially continuous and uniform manner. The adhesive-coated constraining layer is thereafter passed through a heating device, such as first oven 36, to dry the layer of adhesive, and form a laminate structure, such as second laminate structure 14. It should be recognized that the elongated metallic constraining layer 32 can be coated with a thermoset adhesive by a wide range of methods including, but not limited to, spraying, dipping, brushing, roll coating etc., within the scope of the present invention.

If the optional second viscoelastic layer 26 (FIG. 1) is to be integrated into the laminated damping structure 10 (e.g., to provide a thicker rubber viscoelastic core 20, 26, FIG. 2), the second laminate structure 14 is passed or fed through a second coating device (or top coater), which is shown hidden in FIG. 3 at 38. The second coating device 38 is operable to apply a layer of unvulcanized rubber solution, preferably nitrile rubber solved in a solvent, to the laminate structure 14 in a substantially continuous and uniform manner. In this instance, the rubber-coated laminate structure 14 is then passed through another heating device, such as a second oven (shown hidden in FIG. 3 at 40), to dry, but not cure, the layer of rubber. One way rubber is solved is by blending the ingredients of a particular rubber compound in a commercial batch or continuous mixer, and subsequently dissolving the rubber compound into proper solvents. For example, solvents having the power to dissolve nitrile rubber include, but are not limited to, ketones, toluene, etc. The temperature of the second laminate structure 14 is thereafter rapidly cooled, which is accomplished in the arrangement of FIG. 3 with a first water quenching device 42, and subsequently rewound into a coil 44. Optionally, an interleaf layer (not shown) may be applied to the second laminate structure 14 to protect the uncured layer of rubber 26.

Referring now to FIG. 4, a second strip of sheet metal 52 (which may also be referred to as "metallic constraining layer"), is pulled or uncoiled from a second coil of metal sheet stock 50, such as draw quality cold rolled steel, and fed or passed through a third coating device (or top coater) 54. The third coating device 54 is operable to apply a layer of thermoset adhesive (e.g., first adhesive layer 18 of FIGS. 1 and 2) to the elongated metallic constraining layer 52 in a substantially continuous and uniform manner. The adhesive-coated constraining layer is thereafter passed through a heating device, such as third oven 56, to dry the layer of adhesive. The adhesive-coated constraining layer is then passed or fed through a fourth coating device (or top coater) 58. The fourth coating device 58 is operable to apply a layer of unvulcanized rubber solution, preferably nitrile rubber solved in a solvent, over the layer of adhesive in a substantially continuous and uniform manner. The rubber-coated constraining layer is then passed through another heating device, such as a fourth oven 60, to dry, but not cure, the layer of rubber, and form a laminate structure, such as first laminate structure 12.

Once the first and second laminate structures 12, 14 are complete, the two are thereafter laminated or married together. According to the arrangement of FIG. 4, the coil 44 of the second laminate structure 14 is unwound, and then heated—e.g., via a first set of flame bars 62, to increase the temperature of, and thereby activate the second layer of thermoset adhesive 24. To this regard, laminating the first laminate structure 12 to the second laminate structure 14 may also include increasing the temperature of the first layer of rubber 20—e.g., via a second set of flame bars (shown hidden in FIG. 4 at 64) or by oven 60. The laminate structures 12, 14, namely thermally activated rubber layer 20 and adhesive layer 24, are then compressed, for example, by passing the two laminate structures 12, 14 through a nip press, defined by mutually coacting and opposing rolls 66, in a substantially continuous manner, to form the laminated damping structure 10. The temperature of the laminated damping structure 10 is thereafter rapidly cooled, which is accomplished in the arrangement of FIG. 4 with a second water quenching device 72, and subsequently rewound into a coil 74.

The coil 74 is then placed in a heating device, such as fifth oven 76, to increase the temperature of the coiled laminate structures 12, 14, and thereby vulcanize the layer of rubber (e.g., 20, 26 of FIG. 2) and the first and second layers of thermoset adhesive (e.g., 18 and 24 of FIG. 2) in a single, post-lamination batch process. According to preferred practices, increasing the temperature of the coiled laminate structures 12, 14 includes heating the coil 74 at a temperature of approximately 285 degrees Celsius (° C.) for approximately eight hours.

While the best modes for carrying out the present invention have been described in detail, those familiar with the art to which this invention relates will recognize various alternative designs and embodiments for practicing the invention within the scope of the appended claims.

The invention claimed is:

1. A method of manufacturing a laminate damping structure with at least one rubber viscoelastic core, the method comprising:
    applying a first layer of adhesive to a first constraining layer;
    applying a first layer of unvulcanized rubber solved in a solvent to said first layer of adhesive to form a first laminate structure;
    applying a second layer of adhesive to a second constraining layer to form a second laminate structure;
    laminating said first laminate structure to said second laminate structure;
    coiling said laminated first and second laminate structures; and
    heating said coiled first and second laminate structures to thereby vulcanize said first layer of rubber.

2. The method of claim 1, wherein said laminating said first laminate structure to said second laminate structure includes:
    heating said second layer of adhesive; and
    compressing said first laminate structure together with said second laminate structure.

3. The method of claim 2, wherein said laminating said first laminate structure to said second laminate structure further includes heating said first layer of rubber prior to said compressing.

4. The method of claim 2, wherein said compressing includes passing said first and second laminate structures through a nip press in a substantially continuous manner.

5. The method of claim 1, wherein said heating said coiled first and second laminate structures includes heating the coiled said first and second laminate structures at a temperature of approximately 285 degrees Celsius for approximately eight hours.

6. The method of claim 1, wherein each of said first and second constraining layers consists essentially of a metallic material.

7. The method of claim 6, wherein said first and second constraining layers are steel.

8. The method of claim 1, wherein each of said first and second layers of adhesive consists essentially of phenolic adhesives.

9. The method of claim 1, wherein said first layer of unvulcanized rubber consists essentially of nitrile rubber.

10. The method of claim 1, wherein each of said first and second constraining layers has a thickness of approximately 0.254-1.016 millimeters.

11. The method of claim 1, wherein each of said first and second layers of adhesive has a thickness of approximately 0.008-0.018 millimeters.

12. The method of claim 1, wherein said first layer of unvulcanized rubber has a thickness of approximately 0.025-0.203 millimeters.

13. The method of claim 1, further comprising:
    applying a second layer of unvulcanized rubber solved in a solvent to said second layer of adhesive prior to said laminating said first laminate structure to said second laminate structure.

14. A method of manufacturing a noise-damping constrained layer laminate structure with at least one rubber viscoelastic core, the method comprising:
    applying a first layer of thermoset adhesive to a first metallic constraining layer;
    applying a layer of unvulcanized rubber solved in a solvent to said first layer of thermoset adhesive to form a first laminate structure;
    applying a second layer of thermoset adhesive to a second metallic constraining layer to form a second laminate structure;
    heating said second layer of thermoset adhesive;
    compressing said first laminate structure together with said second laminate structure;
    coiling said compressed first and second laminate structures; and
    heating said coiled first and second laminate structures to thereby vulcanize said layer of rubber and said first and second layers of thermoset adhesive.

15. The method of claim 14, wherein each of said first and second metallic constraining layers has a thickness of approximately 0.178-0.508 millimeters.

16. The method of claim 14, wherein each of said first and second layers of thermoset adhesive has a thickness of approximately 0.008-0.018 millimeters.

17. The method of claim 14, wherein said layer of unvulcanized rubber has a thickness of approximately 0.025-0.178 millimeters.

18. The method of claim 14, further comprising:
    heating said layer of rubber prior to said compressing said first laminate structure with said second laminate structure.

19. The method of claim 14, wherein said first and second constraining layers consist essentially of steel, said first and second layers of thermoset adhesive consist essentially of phenolic adhesives, and said layer of unvulcanized rubber consists essentially of nitrile rubber.

20. A method of manufacturing a noise-damping constrained layer viscoelastic laminate structure with a rubber viscoelastic core, the method comprising:
    applying a first layer of thermoset adhesive to a first metallic constraining layer in a substantially continuous and uniform manner;
    drying said first layer of thermoset adhesive;
    applying a layer of unvulcanized rubber solved in a solvent to said first layer of thermoset adhesive in a substantially continuous and uniform manner to form a first laminate structure;
    drying said layer of unvulcanized rubber;
    applying a second layer of thermoset adhesive to a second metallic constraining layer in a substantially continuous and uniform manner to form a second laminate structure;
    drying said second layer of thermoset adhesive;
    heating said second layer of thermoset adhesive;
    compressing said first laminate structure with said second laminate structure in a substantially continuous manner;
    coiling said compressed first and second laminate structures; and
    heating said coiled first and second laminate structures to thereby vulcanize said layer of rubber and said first and second layers of thermoset adhesive.

* * * * *